(12) United States Patent
Kuk et al.

(10) Patent No.: US 9,564,263 B2
(45) Date of Patent: Feb. 7, 2017

(54) CORE ASSEMBLY FOR WIRELESS POWER COMMUNICATION, POWER SUPPLYING DEVICE FOR WIRELESS POWER COMMUNICATION HAVING THE SAME, AND METHOD FOR MANUFACTURING THE SAME

(75) Inventors: Yoon-Sang Kuk, Seoul (KR); Chun-Kil Jung, Seoul (KR)

(73) Assignee: HANRIM POSTECH CO., LTD., Suwon-si, Gyeonggi-do (KR)

( * ) Notice: Subject to any disclaimer, the term of this patent is extended or adjusted under 35 U.S.C. 154(b) by 1073 days.

(21) Appl. No.: 13/808,223

(22) PCT Filed: Jun. 22, 2011

(86) PCT No.: PCT/KR2011/004561
§ 371 (c)(1),
(2), (4) Date: Jan. 3, 2013

(87) PCT Pub. No.: WO2012/008693
PCT Pub. Date: Jan. 19, 2012

(65) Prior Publication Data
US 2013/0106198 A1    May 2, 2013

(30) Foreign Application Priority Data
Jul. 16, 2010 (KR) .................. 10-2010-0068924

(51) Int. Cl.
*H01F 38/14* (2006.01)
*H02J 17/00* (2006.01)
(Continued)

(52) U.S. Cl.
CPC ...... *H01F 17/0006* (2013.01); *H01F 27/2871* (2013.01); *H01F 27/365* (2013.01);
(Continued)

(58) Field of Classification Search
CPC .......... H01F 27/28; H01F 27/36; H01F 38/14; H01F 27/006; H04B 5/00; H04B 5/0037; H02J 5/00; H02J 17/00; H02J 7/025; B60L 11/182; B60L 5/005; Y02T 90/122; H02G 7/16
(Continued)

(56) References Cited

U.S. PATENT DOCUMENTS

2006/0118229 A1* 6/2006 Ohashi ................. G06K 19/077
156/60
2008/0164840 A1* 7/2008 Kato ................... H01F 27/2804
320/108

FOREIGN PATENT DOCUMENTS

CN    200969382        * 10/2007
JP    8-149723 A        6/1996
(Continued)

OTHER PUBLICATIONS

Japanese Office Action issued Mar. 31, 2015 to Japanese Application No. 2013-519567.
(Continued)

*Primary Examiner* — Rexford Barnie
*Assistant Examiner* — Terrence Willoughby
(74) *Attorney, Agent, or Firm* — Envision USA Inc.

(57) ABSTRACT

Disclosed herein are a core assembly for wireless power communication, a power supplying device for wireless power communication having the same, and a method for manufacturing the same. The core assembly for wireless power communication includes: a plate shaped core including concave parts disposed in a main surface thereof and made of a magnetic material; a plurality of winding type coils received in the concave parts and partially overlapping
(Continued)

each other; and a circuit board connected to both ends of each of the coils which controls application of a power to the coils.

19 Claims, 6 Drawing Sheets

(51) Int. Cl.
  *H01F 17/00* (2006.01)
  *H01F 41/02* (2006.01)
  *H02J 5/00* (2016.01)
  *H04B 5/00* (2006.01)
  *H01F 27/28* (2006.01)
  *H01F 27/36* (2006.01)

(52) U.S. Cl.
  CPC ......... *H01F 38/14* (2013.01); *H01F 41/0246* (2013.01); *H02J 5/005* (2013.01); *H02J 17/00* (2013.01); *H04B 5/0037* (2013.01); *H04B 5/0075* (2013.01); *H04B 5/0087* (2013.01)

(58) Field of Classification Search
  USPC .......................................... 307/104; 336/200
  See application file for complete search history.

(56) References Cited

FOREIGN PATENT DOCUMENTS

| | | |
|---|---|---|
| JP | 11-265814 A | 9/1999 |
| JP | 2001-345215 A | 12/2001 |
| JP | 2002-43139 A | 2/2002 |
| JP | 2004-229406 A | 8/2004 |
| JP | 2004-255182 A | 9/2004 |
| JP | 2005-260122 A | 9/2005 |
| JP | 2006-296099 A | 10/2006 |
| JP | 2006-314181 A | 11/2006 |
| JP | 2008-120239 A | 5/2008 |
| JP | 2008-300398 A | 12/2008 |
| JP | 2009-33106 A | 2/2009 |
| JP | 2009-508331 A | 2/2009 |
| JP | 2009-164293 A | 7/2009 |
| JP | 2009-252970 | 10/2009 |
| JP | 2009-252970 A | 10/2009 |
| JP | 2012-511891 A | 5/2012 |
| KR | 10-0971705 | 7/2010 |
| WO | WO 03/105308 A1 | 12/2003 |
| WO | WO 2010/068062 A2 | 6/2010 |

OTHER PUBLICATIONS

Korean Office Action dated Jul. 22, 2011, issued in corresponding Korean Patent Application No. 10-2010-0068924.

* cited by examiner

CORE ASSEMBLY FOR WIRELESS POWER COMMUNICATION, POWER SUPPLYING DEVICE FOR WIRELESS POWER COMMUNICATION HAVING THE SAME, AND METHOD FOR MANUFACTURING THE SAME

CROSS-REFERENCE TO RELATED APPLICATIONS

This application is a U.S. national stage of International Application No. PCT/KR2011/004561, filed Jun. 22, 2011, which claims the benefit of Korean Application No. 10-2010-0068924, filed Jul. 16, 2010, in the Korean Intellectual Property Office. The disclosures of both documents are incorporated herein by reference.

BACKGROUND OF THE INVENTION

1. Field of the Invention

The present invention relates to a core assembly for wireless power communication used in a wireless power communication system, a power supplying device for wireless power communication having the same, and a method for manufacturing the same.

2. Description of the Related Art

Generally, a portable electronic device such as a mobile communication terminal, a personal digital assistant (PDA), or the like, is mounted with a rechargeable battery. In order to charge the battery, a separate charging device providing electrical energy to the battery of the portable electronic device using home commercial power is required.

Typically, the charging device and the battery include separate contact terminals formed at outer portions thereof, respectively, such that the charging device and the battery are electrically connected to each other by connecting the contact terminals to each other. However, when the contact terminals as described above protrude externally, the contact terminals are not attractive in appearance. Also, the terminals may easily be dirtied or contaminated with external foreign materials, such that a contact state therebetween easily deteriorates. In addition, when the battery is short-circuited or exposed to moisture due to carelessness of a user, charged energy may be easily lost.

As an alternative to the above-mentioned contact type charging scheme, a non-contact type (wireless) charging system, which charges the battery without contact between the terminals of each of the charging device and the battery, has been suggested.

SUMMARY OF THE INVENTION

Although not limited thereto, an object of the present invention is to provide a core assembly for wireless power communication in which coils may be disposed so as to effectively reduce an area of non-transmission that may be a hindrance in wireless power transmission to a power receiving device, and the disposition of the coils may be stably maintained, a power supplying device for wireless power communication having the same, and a method for manufacturing the same.

White not limited thereto, according to an exemplary embodiment of the present invention, a core assembly for wireless power communication may comprise a plate shaped core comprising one or more concave parts disposed in a main surface thereof and made of a magnetic material; a plurality of winding type coils received in the concave parts and partially overlapping each other; and a circuit board connected to both ends of each of the coils which controls application of a power to the coils.

According to an aspect of the invention, the concave parts may comprise a first concave part formed at a first depth; and a second concave part formed to be in communication with the first concave part and having a second depth shallower than the first depth.

According to an aspect of the invention, the one or more concave parts may have a contour in the shape of a closed curve, and the first and second concave parts may be recessed in a form in which two small closed curves inscribed in the contour of the concave parts partially overlap each other.

According to an aspect of the invention, portions at which the small closed curves which partially overlap each other may be recessed at the first depth.

According to an aspect of the invention, the closed curve of the contour of the concave parts may have an oval shape.

According to an aspect of the invention, the concave parts may comprise a bottom and a sidewall, and the concave parts may be recessed at a size allowing an outer circumference entirely formed by the plurality of coils overlapping each other to contact the sidewall.

According to an aspect of the invention, at least one of the plurality of coils may be wound in an oval shape.

According to an aspect of the invention, at least one of the plurality of coils may be wound so as to have the same size at least one other of the plurality of coils.

According to an aspect of the invention, the core may comprise at least one support protruding therefrom and inserted into a hollow part of the coil.

According to an aspect of the invention, at least one section of a cross section of the support may have a curved shape so as to fit a portion of an inner circumferential surface of the hollow part of the coil.

According to an aspect of the invention, the core may comprise a plurality of first through-holes through which both ends of each of the coils penetrate, and the circuit board may comprise a plurality of second through-holes corresponding to the plurality of first through-holes.

According to an aspect of the invention, the plurality of first through-holes may comprise at least one pair of through-holes symmetrical to each other with respect to the center of the core.

According to an aspect of the invention, a surface of the circuit board, opposite to another surface thereof facing the core, may comprise a plurality of connection parts which are connected to both ends of each of the coils and which correspond to the number of both ends.

According to an aspect of the invention, the concave parts may comprise grooves, formed in a lower surface of the concave parts, in a direction in which the coils are wound, which receive portions of the coils contacting the lower surface of the concave parts.

White not limited thereto, according to another embodiment of the present invention, a power supplying device for wireless power communication may comprise the core assembly for wireless power communication as described above, further comprising a charging power supplying circuit formed on the circuit board; and a housing which encloses the core assembly.

White not limited thereto, according to still another embodiment of the present invention, a method for manufacturing a core assembly for wireless power communication may comprise adding binders to powders to form a mixture, the powders comprising magnetic materials; putting the mixture in a mold and applying pressure to mold the mixture to become a core having concave parts formed in one surface thereof; sintering the molded core; disposing a plurality of coils wound in the concave parts of the sintered core so as to partially overlap each other; and connecting both ends of each of the coils to a circuit board.

According to an aspect of the invention, the magnetic materials may comprise manganese and zinc.

According to an aspect of the invention, the sintering of the molded core may comprise maintaining a sintering temperature of 60 to 80° C.

Using the core assembly for wireless power communication, the power supplying device for wireless power communication having the same, and the method for manufacturing the same according to the embodiments of the present invention configured as described above, the coils may be disposed so as to effectively reduce an area of non-transmission that may be a hindrance in wireless power transmission to a power receiving device, and the disposition of the coils may be stably maintained.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
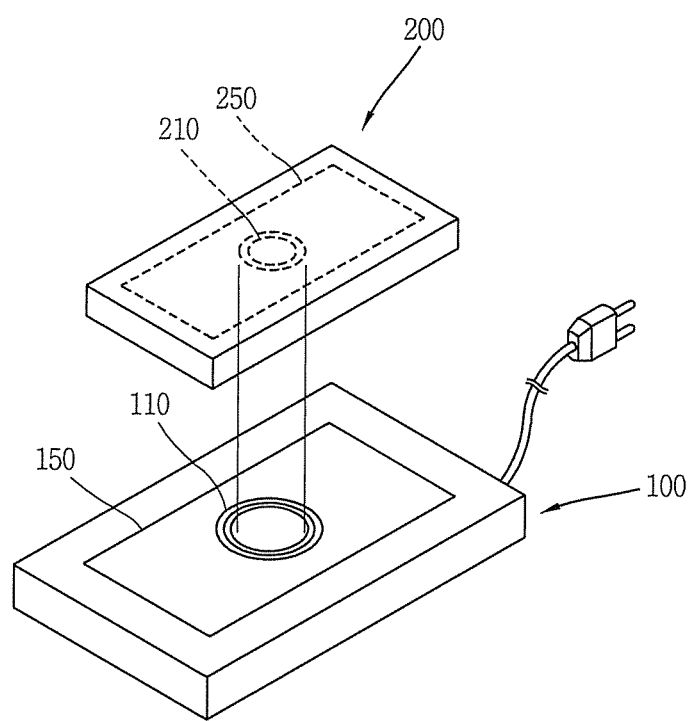
FIG. 1 is a schematic perspective view of a wireless power communication system, according to an embodiment of the present invention.

Hereinafter, a core assembly for wireless power communication, a power supplying device for wireless power communication having the same, and a method for manufacturing the same according to embodiments of the present invention will be described in detail with reference to the accompanying drawings, in order to explain the present invention. The embodiments are described below in order to explain the present invention by referring to the figures. In the present specification, throughout the described embodiments of the present invention, similar components will be denoted by the same or similar reference numerals.

FIG. 1 is a schematic perspective view of a wireless power communication system according to an embodiment of the present invention.

According to the embodiment shown in FIG. 1, the wireless power communication system comprises a power supplying device 100 and a power receiving device 200 which receives power from the power supplying device 100 without a contact in order to charge a battery.

The power supplying device 100 is a device receiving electrical energy supplied from an external power supply to generate charging power to be supplied to the power receiving device 200. The power supplying device 100 may be formed in a pad shape in which the power receiving device 200 may be easily seated thereon. As external power supplied to the power supplying unit 100, alternating current (AC) power, including but not limited to American commercial power (60 Hz, 220V/100V), or direct current (DC) power may be used.

The power receiving device 200 may comprise a battery pack, or a portable electronic device, in which a battery is embedded. In another embodiment, the power receiving device 200 may be a portion of a portable electronic device connected to the battery or a member connected to the battery separately from the portable electronic device. Examples of the portable electronic device may include but are not limited to cellular phones, personal digital assistants (PDAs), MP3 players, or the like. The battery, which is a rechargeable battery cell, may comprise a lithium ion battery, a lithium polymer battery, or the like.

The power supplying device 100 and the power receiving device 200 may comprise a primary coil 110 and a secondary coil 210 corresponding to each other, respectively. The primary and secondary coils 110 and 210 are magnetically coupled with each other by induction coupling. Therefore, the secondary coil 210 is juxtaposed on the primary coil 110, such that a magnetic field generated by the primary coil 110 induces a current in the secondary coil 210.

The power supplying device 100 comprises a charging power supplying circuit 150 (see FIG. 2) embedded therein in order to drive the primary coil 110 to generate the magnetic field. The power receiving device 200 comprises a charging circuit 250 (see FIG. 2) embedded therein in order to charge the battery using electromotive force induced within the secondary coil 210.

Figure 2:
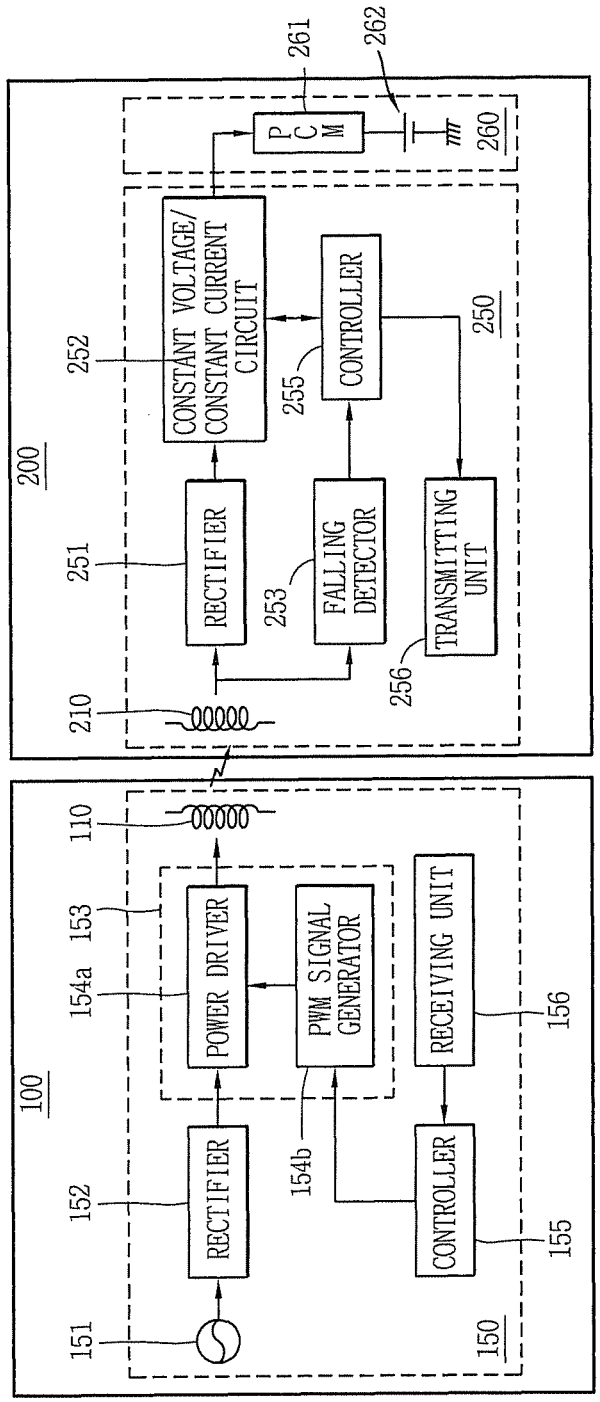
FIG. 2 is an internal functional block diagram of the wireless power communication system of FIG. 1.

Hereinafter, referring to the embodiment shown in FIG. 2, one possible detailed configuration of the charging power supplying circuit 150 and the charging circuit 250 will be described. FIG. 2 is an internal functional block diagram of the wireless power communication system of FIG. 1.

Referring to FIG. 2, the charging power supplying circuit 150 embedded in the power supplying device 100 may be configured to comprise the primary coil 110, a rectifier 152, a driving circuit 153, a controller 155, and a wireless receiving module 156.

The rectifier 152 rectifies an AC voltage from a commercial AC power supply 151 into a DC voltage and then transfers the DC voltage to the driving circuit 153. The driving circuit 153 generates an AC voltage pulse having a high frequency equal to or larger than a commercial frequency using the DC voltage rectified by the rectifier 152 and applies the AC voltage pulse to the primary coil 110 to generate the magnetic field.

The driving circuit 153 may comprise a power driver 154a and a pulse width modulation (PWM) signal generator 154b. The power driver 154b may comprise a high frequency oscillating circuit which converts a predetermined level of DC into an AC voltage having a high frequency equal to or larger than a commercial frequency and a drive circuit which appliesa pulse width modulated high frequency AC voltage pulse to the primary coil 110 to drive the primary coil 110. The PWM signal generator 154*b* may modulate a pulse width of the high frequency AC voltage. Therefore, an output signal transmitted from an output terminal of the power driver 154*a* may become a high frequency AC voltage pulse. The high frequency AC voltage pulse may be a pulse train of which a pulse width may be controlled by the controller 155. As the driving circuit 153 described above, for example, a switching mode power supply (SMPS) may be adopted.

The controller 155 controls a pulse width of the pulse width modulated high frequency AC voltage pulse based on information on a charged state of the battery, fed back through a wireless transmitting module 256 and the wireless receiving module 156. For example, the controller 155 may change a driving mode of the primary coil 110 from a standby mode into a charging mode when a response signal fed back from the charging circuit 250 is a charging start signal. In addition, the controller 155 may change the driving mode of the primary coil 110 from the charging mode to a fully charged mode when it is judged that the battery is fully charged as a result of analyzing the information on the charged state fed back from the charging circuit 250. Likewise, the controller 155 may maintain the driving mode of the primary coil 110 in the standby mode which a response signal fed back from the charging circuit 250 is not present. It will be recognized that yet other information and corresponding driving modes are possible.

The wireless receiving module 156 may comprise a receiving unit such as a demodulator, which demodulates a feedback response signal transmitted from the wireless transmitting module 256 of the charging circuit 250 as the primary coil 110 receives the feedback response signal, thereby reconstructing the information on the charged state of the battery 262. The wireless receiving module 156 may in some embodiments also comprise an antenna (not shown) which receives the feedback response signal transmitted from the wireless transmitting module 256 of the charging circuit 250, separately from the primary coil 110.

The charging power supplying circuit 150 described above may further comprise an over-current filter circuit which protects the circuit from an over-current or a constant voltage circuit which maintains the DC voltage rectified by the rectifier at a predetermined level of voltage. The over-current filter circuit may be disposed between the commercial AC power supply 151 and the rectifier 152, and the constant voltage circuit may be disposed between the rectifier 152 and the driving circuit 153.

Next, the charging circuit 250, which receives the power supplied from the charging power supplying circuit 150 to charge the battery 262 will be described. This charging circuit 250 may be embedded within the power receiving device 200.

The charging circuit 250 may comprise the secondary coil 210, a rectifier 251, a constant voltage/constant current circuit 252, a falling detector 253, a controller 255, and the wireless transmitting module 256.

The secondary coil 210 is magnetically coupled with the primary coil 110 to generate induced electromotive force. As described above, when a power signal applied to the primary coil 110 is the pulse width modulated signal, the induced electromotive force induced in the secondary coil 210 is also an AC voltage pulse train. In addition, an AC voltage pulse induced in the secondary coil 210 according to the driving mode of the primary coil 110 may also take any one of the standby mode, the charging mode, and the fully charged mode.

The rectifier 251 is connected to an output terminal of the secondary coil 210 and planarizes the AC voltage pulse induced by the secondary coil 210 to a predetermined level of DC voltage. The constant voltage/constant current circuit 252 may generate a constant voltage and a constant current to be charged in the battery 262 using the predetermined level of DC voltage. More specifically, the constant voltage/constant current circuit 252 may maintain a current constant mode at an initial charged time of the battery 262 and then may change the constant current mode into a constant voltage mode when a charged voltage of the battery 262 is in a saturated state.

The falling detector 253 is a device which detects a descent time of the AC voltage pulse induced by the secondary coil 210; in other words, a falling time. A falling detecting signal is transmitted to the controller 255.

The controller 255, which may be a kind of microprocessor, receives monitoring signals such as the falling detecting signal, a charged current, a charged voltage, and the like, and controls the constant voltage/constant current circuit 252 and the wireless transmitting module 256 based on the monitoring signal. For example, the controller 255 may recognize the descent time of the pulse based on the falling detecting signal input from the falling detector 253, and may synchronize a transmission time of the feedback response signal to be transmitted to the charging power supplying circuit 150 with the descent time of the pulse. The controller 255 may monitor the charged current and the charged voltage of the battery 262 and may temporally store the monitored value in an internal memory (not shown). The memory may store specification information (a product code, a rating, and the like) of the battery 262 as well as the information on the charged state of the battery 262 such as the monitored charged current and charged voltage therein.

In addition, the controller 255 may appropriately select the constant voltage mode or the constant current mode, and may change between the constant voltage mode and the constant current mode, according to the charged state of the battery 262. The controller 255 may monitor whether an excessive voltage is applied to both ends of the constant voltage/constant current circuit 252, and may generate a request signal for adjusting the charged power when the excessive voltage is applied to both ends of the constant voltage/constant current circuit 252. This request signal may be fed back to the charging power supplying circuit 150 of the power supplying device 100 through the wireless transmitting module 256.

The monitoring operation on the voltage at both ends of the constant voltage/constant current circuit 252 may be performed by measuring a voltage at a front end and a voltage at a rear end of the constant voltage/constant current circuit 252 and inspecting whether or not a difference between the front and rear voltages exceeds a reference voltage. The wireless transmitting module 256 may comprise a transmitting unit which demodulates a base band signal, such as the information on the charged state, when the secondary coil 210 transmits the feedback response signal (a charging start signal, a charged state signal, an adjustment request signal, or the like) to the charging power supplying circuit 150, thereby generating the feedback response signal. The wireless transmitting module 256 may also comprise an antenna which transmits the feedback response signal to the charging power supplying circuit 150, separately from the secondary coil 210.

A protective circuit module (PCM) 261, which prevents an over-voltage or an over-current from being applied to the battery 262, may be disposed between the constant voltage/constant current circuit 252 and the battery 262. The protective circuit module 261 and the battery 262 may constitute a battery unit 260.

Hereinafter, an embodiment of the power supplying device 100 will be described in more detail.

Figure 3:
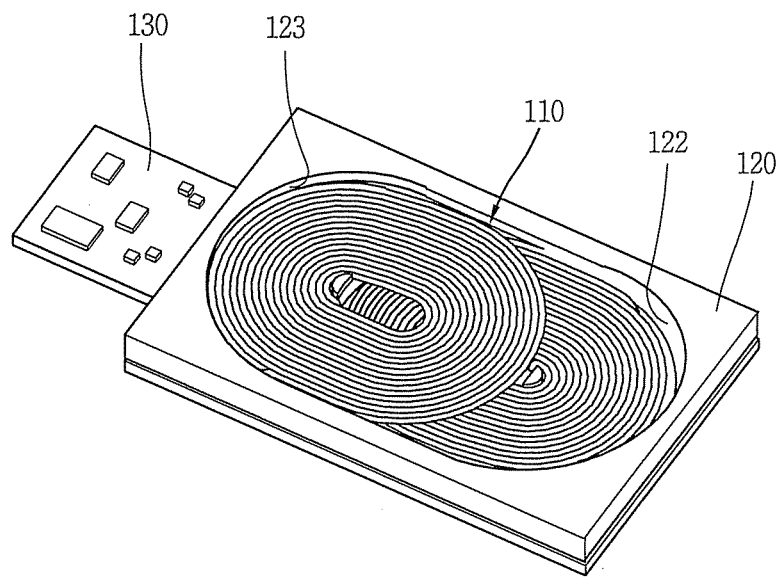
FIG. 3 is an assembled perspective view of a core assembly for wireless power communication according to an embodiment of the present invention, viewed from a front surface.

FIG. 3 is an assembled perspective view of a core assembly for wireless power communication, according to an embodiment of the present invention, viewed from a front surface.

Referring to the embodiment of FIG. 3, the power supplying device 100 comprises a core assembly or the like, and a housing (see FIG. 1) enclosing the core assembly to form an exterior.

The core assembly may comprise a plurality of coils 110, a plate shaped core 120, and a circuit board 130.

The plurality of coils 110 may have a winding form with two free ends. Coils 110 adjacent to each other among the plurality of coils 110 may be disposed to partially overlap each other. In the shown embodiment, a form in which two coils 110 partially overlap each other is illustrated.

The core 120 may have a plate shape. In the shown embodiment, the case in which the core 120 substantially has a rectangular parallelepiped shape is illustrated. A wide surface, i.e. a main surface, of the core 120 comprises concave parts 122 and 123 for receiving the coils 110. The core 120 is made of a magnetic material to reduce the possibility that a magnetic field generated by current flowing in the received coil 110 will deviate from a direction toward the power receiving device 200 (see FIG. 1).

The circuit board 130 may be at least partially positioned beneath the core 120. One portion of the circuit board 130 supports the core 120. The circuit board 130 may comprise a control circuit embedded in another portion thereof in order to control application of the power to the coil 110. The control circuit may include the charging power supplying circuit 150 (see FIG. 2).

Figure 4:
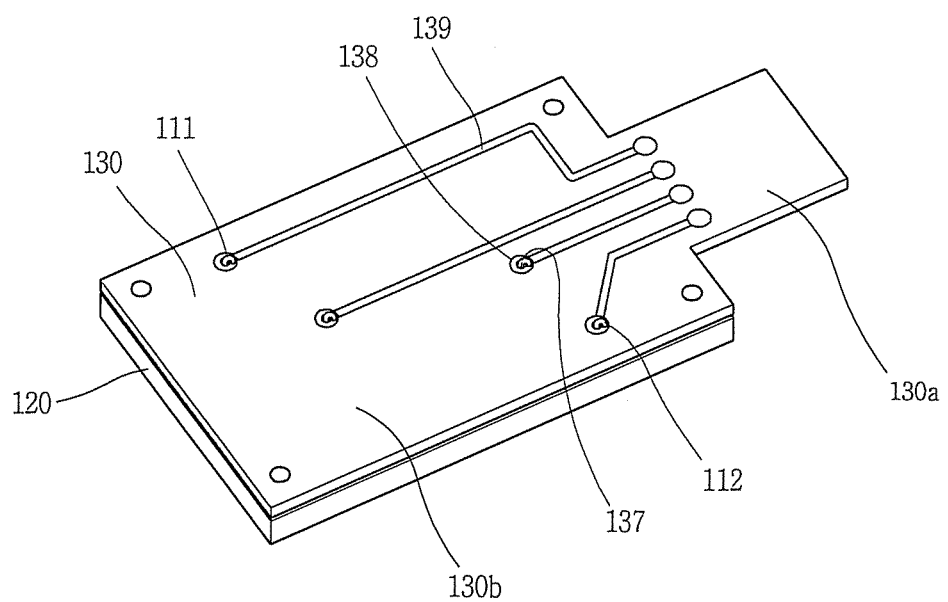
FIG. 4 is an assembled perspective view of the core assembly of FIG. 3, viewed from a rear surface.

FIG. 4 is an assembled perspective view of the core assembly of FIG. 3, viewed from a rear surface.

Referring to the embodiment of FIG. 4, both ends of each of the coils 110 are extended while penetrating through the core 120 and the circuit board 130. More specifically, both ends of the coils 110 penetrate through through-holes 137 formed in a lower surface (i.e. a surface opposite to another surface facing the core 120) of the circuit board 130. In the shown embodiment, the free ends of the coils 110 are connected to connection parts 138 which are adjacent to and enclosing the through-holes 137 in FIG. 4.

The connection parts 138 may be connected to conductive patterns 139 extended from one portion 130*b* of the circuit board 130 toward another portion 130*a* thereof. Therefore, the charging power supplying circuit 150 (see FIG. 2) disposed at another portion 130*a* of the circuit board 130 may be connected to and controls the coils 110.

In the shown embodiment, two through-holes 137 adjacent to each other are disposed at an upper area based on a central line of the circuit board 130. Another pair of through-holes 137 adjacent to each other is disposed at a lower area based on the above-mentioned central line. Therefore, the conductive patterns 139 may be separately disposed in different areas.

Figure 5:
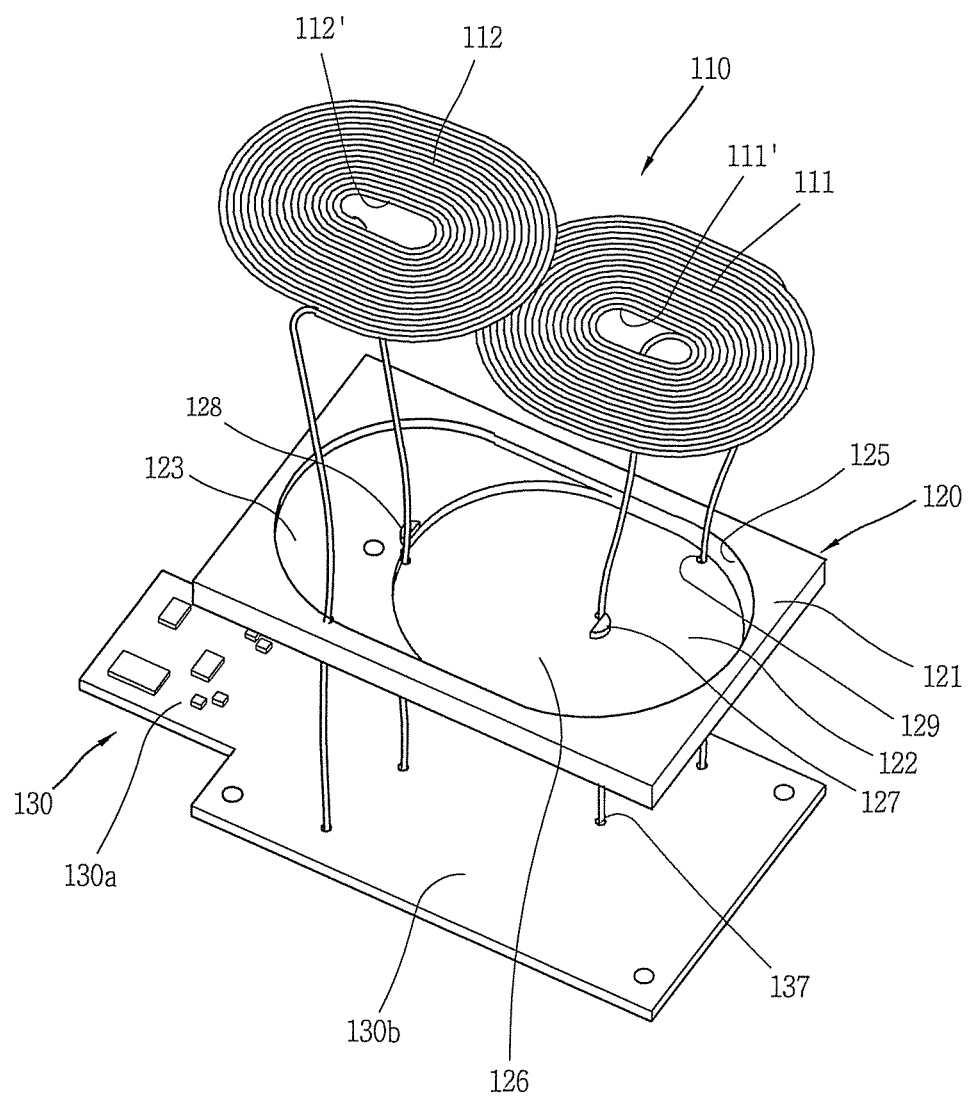
FIG. 5 is an exploded perspective view of the core assembly of FIG. 3.

FIG. 5 is an exploded perspective view of the core assembly of FIG. 3.

Referring to the embodiment of FIG. 5, the coil 110 may comprise a pair of coils: for example, a first coil 111 and a second coil 112. The first and second coils 111 and 112 may comprise hollow parts 111' and 112' formed at central portions thereof, respectively. Areas of the hollow parts 111' and 112' may be adjusted by degrees of winding in the coils 111 and 112.

The first and second coils 111 and 112 may be wound to have substantially the same size. Each of the first and second coils 111 and 112 may be wound to form one plane. The planes formed by the first and second coils 111 and 112 may be disposed parallel to each other (see FIG. 3).

The first and second coils 111 and 112 may be formed in an oval shape. Such embodiments maximize a size in a length direction occupied by the first and second coils 111 and 112 overlapping each other, while maximizing an overlapped area between the first and second coils 111 and 112.

The core 120 may substantially have the rectangular parallelepiped shape as described above. The main surface 121 of the core 120 may comprise the concave parts 122 and 123 which receive the coils 110. The concave parts 122 and 123 may comprise a first concave part 122 recessed at a first depth and a second concave part 123 recessed at a second depth. In the shown embodiment, the first coil 111 is received in the first concave part 122 and the second coil 112 is received in the second concave part 123. Here, since the first coil 111 is positioned under the second coil 112, it is preferable that the first depth is deeper than the second depth.

Again referring to the embodiment of FIG. 5, the concave parts 122 and 123 are formed by being recessed to have a contour in the shape of a closed curve, more specifically, an oval contour. When the entire concave parts 122 and 123 form a large oval contour, each of the first and second concave parts 122 and 123 form a contour in which small ovals inscribed in the large oval partially overlap each other. The small ovals are recessed at the first and second depths described above, respectively. The overlapped part between the small ovals may be recessed at the first depth and be defined as a portion of the first concave part 122.

The concave parts 122 and 123 may have a size such that they tightly receive an outer circumference of an assembly comprising the first and second coils 111 and 112 which partially overlap each other. Therefore, the first and second coils 111 and 112 are only received in the concave parts 122 and 123, such that they may maintain a predetermined position in the power supplying device 100.

The concave parts 122 and 123 have a sidewall 125 and a bottom 126 matching a shape thereof. The sidewall 125 has a height corresponding to the depths at which the concave parts 122 and 123 are recessed. The sidewall 125 may have a size corresponding to a thickness of the coil 110, which blocks or alleviates leakage of a magnetic field generated in the coil 110 in a direction toward the sidewall 125. The sidewall 125 contacts the outer circumference of the tightly received coil 110 as described above to allow the coil 110 to be seated at a predetermined position.

The concave parts 122 and 123 may comprise supports 127 and 128 protruding from a bottom 126 thereof, respectively. The supports 127 and 128 may be disposed such that they may be inserted into the hollow part 111' of the first coil 111 or the hollow part 112' of the second coil 112. Therefore, the supports 127 and 128 may allow the first coil 111 or the second coil 112 to maintain a predetermined position and thereby a disposition relationship between the first and second coils 111 and 112 as set.

The supports 127 and 128 may have a shape corresponding to shapes of inner circumferential surfaces of the hollow parts 111' and 112' of the coils 110, respectively. In the shown embodiment, outer circumferences of the supports 127 and 128 comprise a curved section, corresponding to the inner circumferential surfaces of the hollow parts 111' and 112' having a curved shape. A side opposite to the curved section of the supports 127 and 128 may be a straight line section in order to secure a space for avoiding interference with an outer circumference of the coil 110. Therefore, each of the supports 127 and 128 may be a protrusion extended so as to have a semi-circular cross-section.

The bottom 126 of the concave parts 122 and 123 may comprise first through-holes 129 through which both ends of the coils 111 and 112 penetrate. The circuit board 130 may be provided with second through-holes 137 corresponding to the first through-holes 129.

The coils 111 and 112 have been represented with an intentionally exaggerated length in FIG. 5 in order to show both end of the coils 111 and 112 penetrating through the through-holes 129 and 137, even in the exploded perspective view. It will be understood by those skilled in the art with reference to the assembled view of FIG. 3 that the coils 111 and 112 need not be as long as shown in FIG. 5.

There may be four first through holes 129, that is, one pair corresponding to both ends of the first coil 111 and another pair corresponding to both ends of the second coil 112. The respective pairs of through-holes 129 may be disposed in a form similar to each other. More specifically, any ones of the respective different pairs of through-holes 129 may be symmetrical to each other, and the other ones of the respective different pairs of through-holes 129 may also be symmetrical to each other, each with respect to the center of the core 120. The described symmetry of through-holes 129 is possible due to the fact that the first and second coils 111 and 112 are formed to have a shape similar to each other. Such a disposition removes the inconvenience that the first and second coils 111 and 112 should intentionally be separately assembled.

Figure 6:
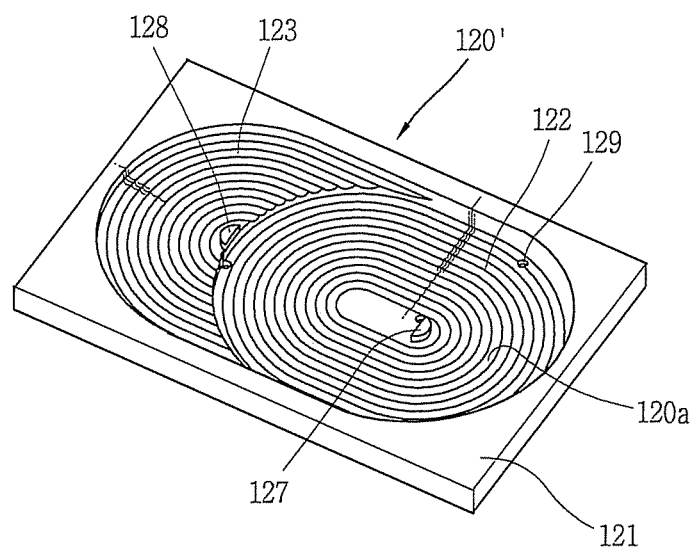
FIG. 6 is a perspective view showing a core according to a modification of the embodiment of FIG. 3.
Figure 7:
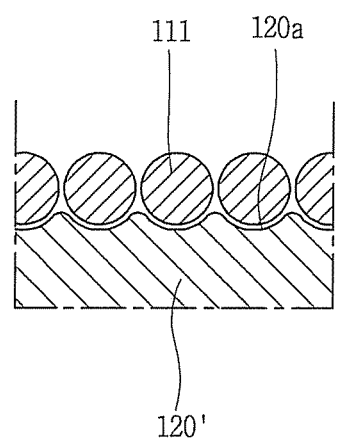
FIG. 7 is a partial conceptual diagram showing a state in which a coil is seated on the core of FIG. 6.

FIG. 6 is a perspective view showing a core 120' according to a modification of the embodiment of FIG. 3, and FIG. 7 is a partial conceptual diagram showing a state in which a coil 111 is seated on the core 120' of FIG. 6.

Referring to the embodiment of FIG. 6, in the core 120', grooves 120a may be formed in the concave parts 122 and 123 in a direction in which the coils 111 and 112 (see FIG. 3) are wound.

In the shown embodiment, the grooves 120a are formed in both in the second concave part 123 and the first concave part 122. However, in other embodiments, the grooves 120a need not be necessarily formed in all or any concave parts 122 and 123.

Referring to the embodiment of FIG. 7, the coils 111 and 112 may be seated on the groove 120a. Therefore, the grooves 120a may assist in maintaining the coils 111 and 122 at a predetermined position together with the supports 127 and 128 (see FIG. 5). In addition, because the coils 111 and 112 are seated on the grooves 120a, copper loss of the coils 111 and 112 may be reduced.

Figure 8:
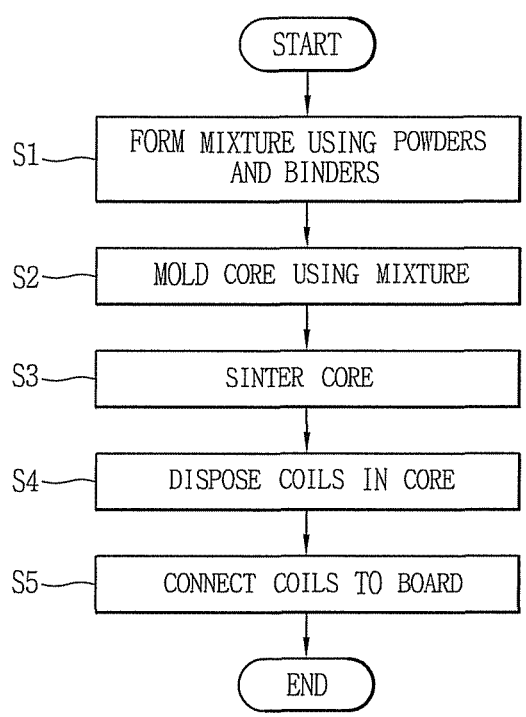
FIG. 8 is a flow chart showing a method for manufacturing a core assembly for wireless power communication, according to an embodiment of the present invention.

FIG. 8 is a flow chart showing a method for manufacturing a core assembly for wireless power communication, according to an embodiment of the present invention.

Referring to the embodiment of FIG. 8, in the method for manufacturing the core assembly for wireless power communication described above, it may be required to manufacture the core 120 or 120'.

In order to manufacture the core 120 or 120', powders and binders may be mixed with each other to form a mixture (S1). Here, the powder may comprise a material allowing the core 120 or 120' to have magnetism. To this end, in the shown embodiment, the powder may comprise manganese-zinc components.

The mixture may be molded to have a shape of the core 120 or 120' (S2). To this end, the mixture may be put in a mold and pressed to thereby be molded in the shape of the core 120 or 120'. Through the above-mentioned pressing, the core 120 or 120' may be molded to have the concave parts 122 and 123, the supports 127 and 128, and the through-holes 129.

The molded core 120 or 120' may be subjected to a sintering process (S3). In the sintering process, the manganese-zinc powder or other powder may be maintained at a low temperature, for example, a temperature of 60 to 80° C.

The coils 110 may be disposed in the concave parts 122 and 123 of the sintered core 120 or 120' (S4).

Both ends of the coils 110 may be connected to the connection parts 138 formed at the lower surface of the circuit board 130 through the through-holes 129 of the core 120 or 120' and the through-holes 137 of the circuit board 130 (S5).

The core assembly for wireless power communication, the power supplying device for wireless power communication having the same, and the method for manufacturing the same as described above are not limited to the configuration and the operation scheme of the above-mentioned embodiments. It would be appreciated by those skilled in the art that changes may be made in this embodiment without departing from the principles and spirit of the invention, the scope of which is defined in the claims and their equivalents. The above-mentioned embodiments may also be variously modified through a selective combination of all or some thereof.

The invention claimed is:

1. A core assembly for wireless power communication comprising:
    a plate shaped core comprising concave parts disposed in a main surface thereof and made of a magnetic material; and
    a plurality of winding type coils received in the concave parts and partially overlapping each other,
    wherein the concave parts comprise:
    a first concave part formed at a first depth; and
    a second concave part formed to be in communication with the first concave part and having a second depth shallower than the first depth,
    wherein the first concave part receives a first coil and the second concave part receives a second coil.

2. The core assembly for wireless power communication of claim 1, wherein the concave parts have a contour in the shape of a closed curve, and
    the first and second concave parts are recessed in a form in which two small closed curves inscribed in the contour of the concave parts partially overlap each other.

3. The core assembly for wireless power communication of claim 2, wherein portions at which the small closed curves partially overlap each other are recessed at the first depth.

4. The core assembly for wireless power communication of claim 2, wherein the closed curve of the contour of the concave parts has an oval shape.

5. The core assembly for wireless power communication of claim 1, wherein the concave parts comprise a bottom and a sidewall, and the concave parts are recessed at a size allowing an outer circumference entirely formed by the plurality of coils overlapping each other to contact the sidewall.

6. The core assembly for wireless power communication of claim 1, wherein at least one of the coils is wound in an oval shape.

7. The core assembly for wireless power communication of claim 6, wherein at least one of the plurality of coils is wound so as to have the same size as at least one other of the plurality of coils.

8. The core assembly for wireless power communication of claim 1, wherein the core comprises at least one support protruding therefrom and inserted into a hollow part of the coil.

9. The core assembly for wireless power communication of claim 8, wherein at least one section of a cross section of the support has a curved shape so as to fit a portion of an inner circumferential surface of the hollow part of the coil.

10. The core assembly for wireless power communication of claim 9, wherein the core comprises a plurality of first through-holes through which both ends of each of the coils penetrate,
the core assembly further comprising a circuit board connected to both ends of each of the coils and configured to control application of a power to the coils, the circuit board comprising a plurality of second through-holes corresponding to the plurality of first through-holes.

11. The core assembly for wireless power communication of claim 10, wherein the plurality of first through-holes comprise at least one pair of through-holes symmetrical to each other with respect to the center of the core.

12. The core assembly for wireless power communication of claim 10, wherein a surface of the circuit board, opposite to another surface thereof facing the core, comprises a plurality of connection parts which are connected to both ends of each of the coils, the number of connection parts corresponding to the number of ends.

13. The core assembly for wireless power communication of claim 1, wherein the concave parts comprise grooves, formed in a lower surface of the concave parts, in a direction in which the coils are wound, the grooves configured to receive portions of the coils contacting the lower surface of the concave parts.

14. A power supplying device for wireless power communication comprising:
the core assembly for wireless power communication of claim 1, further comprising a circuit board connected to both ends of each of the coils and configured to control application of a power to the coils, and a charging power supplying circuit disposed on the circuit board; and
a housing which encloses the core assembly.

15. The power supplying device for wireless power communication of claim 14, wherein the circuit board comprises a charging power supplying circuit.

16. The power supplying device for wireless power communication of claim 15, wherein the charging power supplying circuit comprises:
a driving circuit configured to drive the operation of the coils;
a rectifier configured to convert an AC power to a DC power and supply the DC power to the driving circuit;
a wireless receiving module configured to receive signals from a power receiving device; and
a controller configured to change or maintain a driving mode of the driving circuit based on the signal received by the wireless receiving module.

17. The core assembly for wireless power communication of claim 1, wherein the magnetic material of the plate shaped core comprises a mixture of manganese and zinc.

18. The core assembly for wireless power communication of claim 1, further comprising a circuit board connected to both ends of each of the coils and configured to control application of a power to the coils.

19. The core assembly for wireless power communication of claim 1, wherein one or more of the coils is wound in the shape of an ellipse or circle.

* * * * *